United States Patent
Summers et al.

(10) Patent No.: US 11,733,385 B1
(45) Date of Patent: Aug. 22, 2023

(54) BROADENING THE MEASUREMENT RANGE OF OPTICAL SHUTTER-GATED LIGHT DETECTION AND RANGING (LIDAR)

(71) Applicant: Amazon Technologies, Inc., Seattle, WA (US)

(72) Inventors: Joseph Andrew Summers, Seattle, WA (US); Ryan J. Suess, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 16/916,445

(22) Filed: Jun. 30, 2020

(51) Int. Cl.
*G01S 17/10* (2020.01)
*G01S 7/486* (2020.01)
*G01S 7/499* (2006.01)
*G01S 17/89* (2020.01)
*G01S 17/18* (2020.01)

(52) U.S. Cl.
CPC ............ *G01S 17/10* (2013.01); *G01S 7/4868* (2013.01); *G01S 7/499* (2013.01); *G01S 17/18* (2020.01); *G01S 17/89* (2013.01)

(58) Field of Classification Search
CPC ........ G01S 17/10; G01S 7/4868; G01S 7/499; G01S 17/18; G01S 17/89; G01S 17/00
See application file for complete search history.

(56) References Cited

U.S. PATENT DOCUMENTS

| | | | |
|---|---|---|---|
| 3,689,156 A * | 9/1972 | Kerpchar | G01S 17/18 351/49 |
| 9,405,171 B2 * | 8/2016 | Grasser | G01S 7/4861 |
| 11,073,390 B2 | 7/2021 | Lee | |
| 2014/0341555 A1 * | 11/2014 | Grasser | G03B 9/70 362/11 |
| 2018/0267151 A1 | 9/2018 | Hall et al. | |

OTHER PUBLICATIONS

Peng Zhang, Xiaoping Du, Jiguang Zhao, Yishuo Song, and Hang Chen, "High resolution flash three-dimensional LIDAR systems based on polarization modulation," Applied Optics, vol. 56, Issue 13, pp. 3889-3894 (2017).
Chenfei Jin, Xiudong Sun,* Yuan Zhao, Yong Zhang, and Liping Liu,"Gain-modulated three-dimensional active imaging with depth-independent depth accuracy," Optics Letters, vol. 34, No. 22, Nov. 15, 2019, 3 pages.
(Continued)

*Primary Examiner* — Jonathan M Hansen
(74) *Attorney, Agent, or Firm* — Athorus, PLLC

(57) ABSTRACT

A technique for increasing the measurement range of a light detection and ranging (LIDAR) system includes triggering a light source of the LIDAR system to emit light pulses towards an environment at a first repetition rate. A different second repetition rate for operation of a shutter of the LIDAR system is determined. The operation of the shutter is synchronized with the light source, based on the second repetition rate, such that reflections caused by the light pulses arrive at the shutter when the shutter is in different states during the time period. An intensity of the reflections that arrive at the shutter is determined. A range to objects in the environment is determined based on the measured intensity of the reflections.

20 Claims, 9 Drawing Sheets

(56) References Cited

OTHER PUBLICATIONS

Park et al. "Three-dimensional imaging using fast micromachined electro-absorptive shutter," Journal of Micro/Nanolithography, MEMS, and MOEMS, Apr.-Jun. 2013, 12 pages.
U.S. Naval Research Laboratory press release, Free Space Photonics Communiations Office, retrieved Sep. 5, 2018, 3 pages.
U.S. Appl. No. 16/834,563, "Background Light Resilient Flash LIDAR", filed Mar. 30, 2020.

* cited by examiner

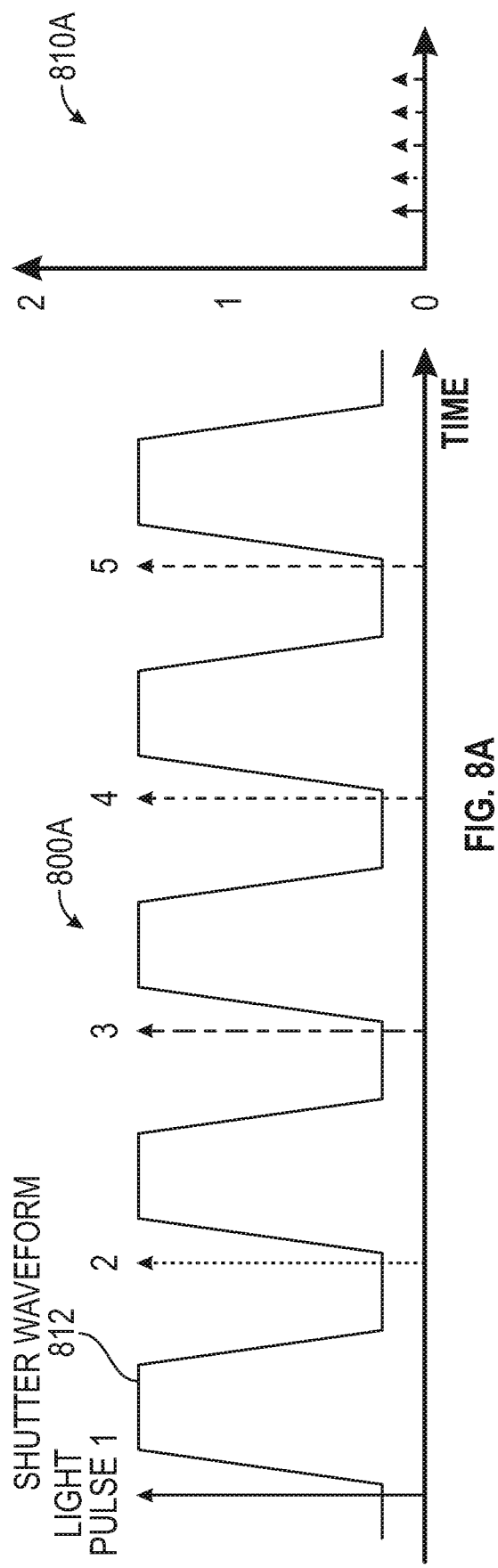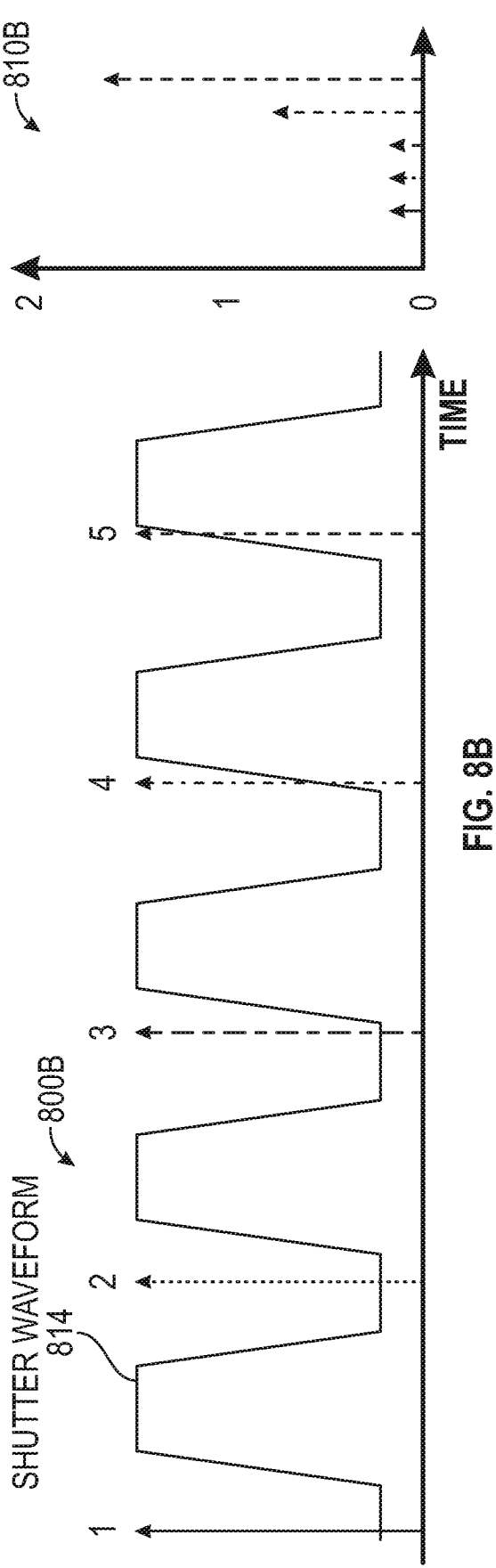
FIG. 8A
FIG. 8B

BROADENING THE MEASUREMENT RANGE OF OPTICAL SHUTTER-GATED LIGHT DETECTION AND RANGING (LIDAR)

BACKGROUND

The present invention relates to light detection and ranging (LIDAR) systems, and more specifically, to techniques for increasing the measurement range of a shutter-gated LIDAR system.

LIDAR (also referred to as LiDAR and LADAR) is a technique that is often employed to obtain range or depth information about a target and generate three-dimensional (3D) images (or maps) of the target. For example, a LIDAR system typically measures distance to a target by illuminating the target with pulsed laser light and measuring the reflected pulses with a sensor. The reflected pulses are then used to generate 3D images. LIDAR systems are used in a variety of applications in which accurate range information about a target is needed. For example, using the data collected by a LIDAR system, it is possible to perform terrestrial mapping, target detection and recognition, obstacle detection and avoidance, 3D object capture, component inspection, etc.

Two conventional techniques that LIDAR systems typically employ to obtain 3D images include a scanning technique and a flash technique. The scanning technique uses one or more detector pixels and a scanner to acquire 3D images. For example, in the scanning technique, multiple laser pulses are sent out from a laser system, and each laser pulse is directed to a different point on the target by a scanner. The time-of-flight (ToF) (of the reflected pulse) is then obtained for each target point, using a single detector pixel. The flash technique, in contrast, uses an array (e.g., two-dimensional (2D)) detector and a single laser pulse to illuminate the entire target and acquire 3D images.

BRIEF DESCRIPTION OF DRAWINGS

Various embodiments in accordance with the present disclosure will be described with reference to the drawings, where like designations denote like elements.

FIG. 8A illustrates operation of a shutter when a target is located outside of a range gate of the shutter.

FIG. 8B illustrates operation of a shutter having an extended range gate when a target is located outside of the range gate of the shutter, according to one embodiment.

DETAILED DESCRIPTION

Some LIDAR systems employ fast optical shutters (e.g., photoacoustic devices, polarization modulators, electro-absorption modulators, etc.) to obtain 3D images. In a shutter-gated LIDAR system, for example, a scattered (e.g., reflected) light pulse from a target may pass through an optical shutter (as it is transitioning from an "off" state to an "on" state, and vice versa) and may be detected by a receiver (e.g., an image (camera) sensor). The receiver can measure an intensity of the received light pulse and determine, based on the measured intensity, the time-of-arrival (ToA) of the pulse and the distance to the target.

In shutter-gated LIDAR systems, the target range information is generally encoded onto the light pulses that pass through the shutter as it is switching from a first state to a second state, or vice versa. As a result, the length of time it takes for the shutter to switch between states can limit the measurement range of such LIDAR systems. In conventional shutter-gated LIDAR systems, the switching time can be adjusted to increase the measurement range. However, this typically requires modifying the hardware of the LIDAR system, for example, by adding parasitic elements to increase the impedance of the load (the shutter, in this case). Modifying the switching time in this conventional manner generally translates to a higher power consumption, which, in turn, can lead to larger components, increased costs, and reduced efficiency.

To address this, embodiments herein describe techniques for increasing the measurement range of a shutter-gated LIDAR system by dynamically increasing the effective width (or duration) of the shutter switching window. As described in more detail below, embodiments can generate a trigger sequence to change a repetition rate of the shutter (relative to a repetition rate of a laser source), so that the shutter samples reflected pulses over a range wider than the shutter switching window (or transitions) (as opposed to sampling each reflected pulse at a same point of time during the shutter pulses). In this manner, embodiments can dynamically increase the measurement range of LIDAR without requiring hardware changes to the shutter or the shutter driving electronics and without increases in power consumption. As such, embodiments can increase the usefulness of LIDAR for a wide variety of applications, including but not limited to, high speed photography/metrology, pointing error and turbulence tolerant free-space optical communications, robotics, environmental measurement and monitoring, autonomous vehicles, autonomous delivery devices, etc.

Figure 1:
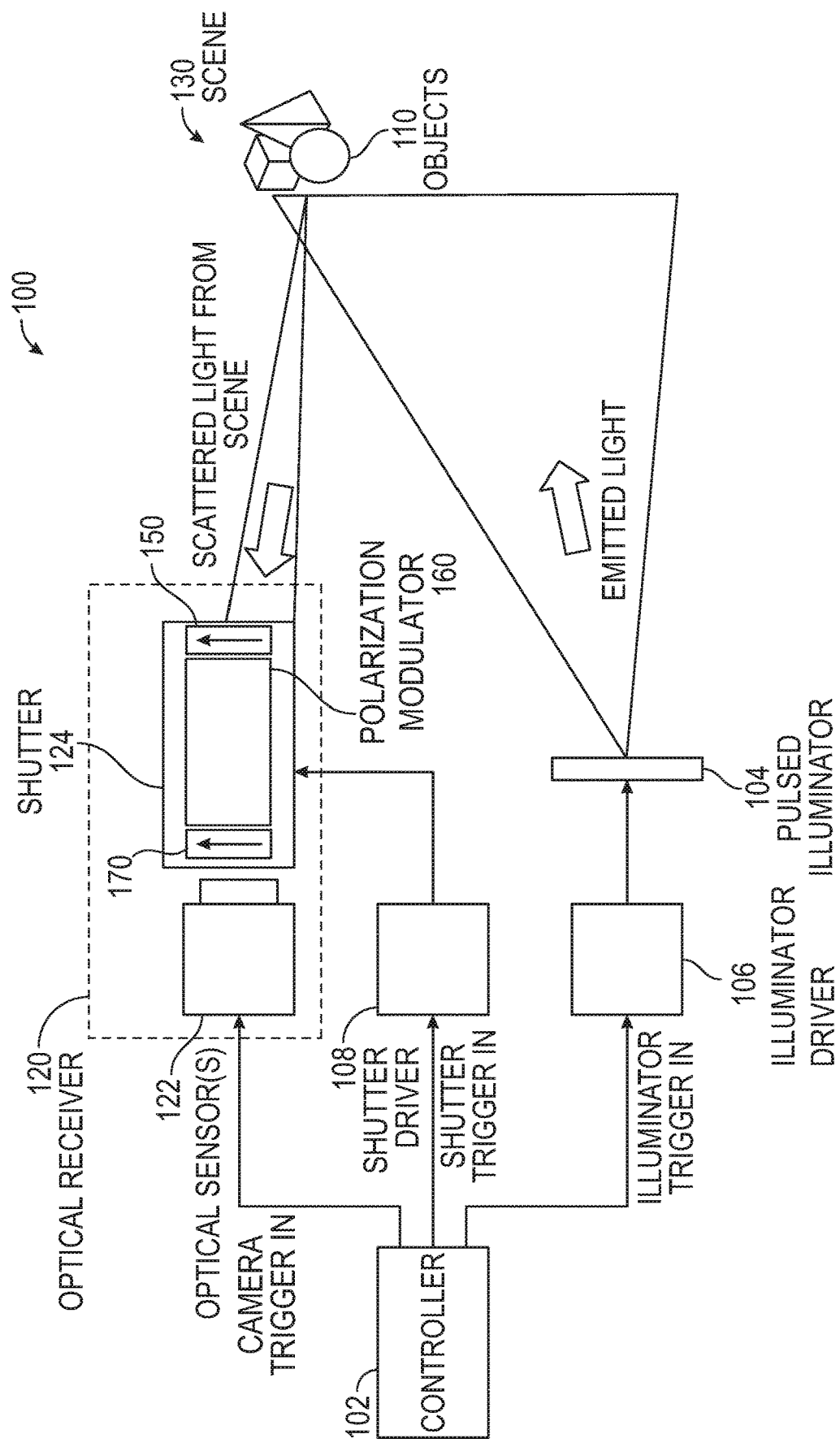
FIG. 1 is a block diagram illustrating a LIDAR system, according to one embodiment.

FIG. 1 is a block diagram illustrating a LIDAR system 100, according to one embodiment. In one embodiment, the LIDAR system 100 is implemented as a polarization-modulated flash LIDAR system. As shown, the LIDAR system 100 includes a controller 102, an illuminator driver 106, a shutter driver 108, and an optical receiver 120. The optical receiver 120 includes an optical sensor 122 and a (optical) shutter 124. The controller 102, illuminator driver 106, the shutter driver 108, the optical sensor 122, and the shutter 124 can include hardware components, software modules, or combinations thereof. The controller 102 is representative of a variety of computing devices (or systems), including a laptop computer, mobile computer (e.g., a tablet or a smartphone), microcontroller or other embedded system, server, etc.

Although depicted separately, in one embodiment, the controller 102, illuminator driver 106, and the shutter driver 108 can be implemented with a single component, e.g., with clock circuitry, pulse (generator) circuitry, delay pulse generator circuitry, driver circuitry, power supply, and/or similar control components to trigger operation of component(s) of the LIDAR system 100. In some embodiments, the controller 102, illuminator driver 106, and the shutter driver 108 can be implemented with more than three components.

The controller 102 is configured to control operation of the optical sensor 122, the shutter 124 (e.g., via the shutter driver 108), and the pulsed illuminator 104 (e.g., via the illuminator driver 106). For example, the controller 102 can generate and apply electrical signals (e.g., control and/or clock signals) to the illuminator driver 106, shutter driver 108, and the optical sensor 122. In one embodiment described in more detail below, the electrical signals may include signals to synchronize operation of the optical sensor 122, the shutter 124, and the pulsed illuminator 104 to broaden the measurement range of the LIDAR system 100 according to one or more of the techniques described herein.

The pulsed illuminator 104 is configured to transmit (or emit or output) a light pulse (or beam) to the scene (or target) 130. In one embodiment, the pulsed illuminator 104 is a laser array. More generally, the pulsed illuminator 104 can be any type of laser/light source. The light pulse may include a laser pulse, light emitting diode (LED) pulse, etc. More generally, a light pulse may also be referred to as a beam, an optical pulse, an optical signal, an optical waveform, etc. In one example, the controller 102 sends a control signal (e.g., "illuminator trigger") to the illuminator driver 106 to trigger the pulsed illuminator 104 to transmit a light pulse to the scene 130. The controller 102 can generally configure the repetition rate, energy, and duration of the light pulse that is output from the pulsed illuminator 104. As described below, the controller 102 can send the "illuminator trigger" at a predefined frequency (e.g., $f_{LD}$) in order to drive the pulsed illuminator 104 at a desired repetition rate. As used herein, the control signal (or "illuminator trigger") may also be referred to as a pulse sequence or control sequence.

Although not shown, in some embodiments, the light pulse that is output from the pulsed illuminator 104 may optionally pass through TX optics (e.g., lens, mirrors, diffusers, etc.) before reaching the scene 130. In one reference example, the TX optics can include a set of collimating lenses and an optical diffuser (e.g., rotating diffuser, holographic diffuser, etc.) to provide laser speckle reduction (e.g., reduce coherent artifacts from the light illumination). In some cases, the optical diffuser can be placed at the focal point of the collimating lenses. In some cases, the optical diffuser can be placed over the emitting elements (e.g., LED or vertical-cavity surface-emitting lasers (VCSEL) array). In addition to speckle reduction, the optical diffuser can be used to tailor the illuminated field of view, or create an even light field when an array of emitting elements is used. In another reference example, assuming pulsed illumination from a LED is used for the LIDAR system 100, the TX optics may not include a diffusing element.

The light pulse output from the pulsed illuminator 104 is directed to the scene 130 and reflected by one or more objects 110 in the scene 130. That is, each of the objects 110 may correspond to a different reflection of the pulsed light emitted by the pulsed illuminator 104. In some cases, the reflected (or backscattered) light pulses from the objects 110 may be initially received at an optical filter (not shown) that filters out light that has a wavelength or frequency that is different from the wavelength or frequency of the light emitted by the pulsed illuminator 104. For example, if the pulsed illuminator 104 emits light with a 940 nm wavelength, the optical filter can remove any light that has a frequency greater than or less than this wavelength (within some tolerance (e.g., +/−5%) so the filtered light has substantially the same wavelength as the emitted pulses). This permits the reflected laser pulses to enter into the LIDAR system 100 while removing light at different wavelengths. In some embodiments, after passing through the optical filter, the light may optionally pass through RX optics (not shown) (e.g., lens, focusing elements, etc.).

The shutter 124 may receive the reflected light pulses from the scene 130. The shutter 124 includes a linear polarizer 150, a polarization modulator 160, and an analyzing polarizer 170. In some embodiments, the linear polarizer 150 filters out any received light that does not have a predefined polarization (e.g., a linear polarization in a particular direction). In one particular example, the linear polarizer 150 may permit light with only a vertical polarization (e.g., a polarization in the page) to pass through. That is, the linear polarizer 150 is generally used to reject unwanted polarized light from the reflected light pulses so that light entering the shutter 124 has the same initial polarization. For example, assuming the linear polarizer 150 is configured parallel to the emitted linear polarized light (of the light pulse), the linear polarizer 150 can filter out unwanted polarized light to output only linear polarized light parallel to the emitted linear polarized light. Note, however, this example assumes (1) the pulsed illuminator is emitting single mode (one polarization), (2) there is no diffuser present (or, if there is a diffuser present, the diffuser has little impact on polarization), and (3) the reflections preserve polarization.

The polarization modulator 160 (e.g., Pockels cell) is arranged at an output of the linear polarizer 150 and is configured to change the polarization of incident light. As used herein, a polarization modulator may also be referred to as a polarization rotator, a tunable waveplate, a modulation cell, etc. In this embodiment, the linearly polarized light can pass through the polarization modulator 160 in the shutter 124, and the polarization modulator 160 can selectively change the polarization of the reflections received from the objects 110. In one embodiment, the polarizations of the reflections are changed to different values depending on the distances the objects 110 are from the LIDAR system 100 and the time at which the reflections arrive at the LIDAR system 100. That is, the reflection caused by a first object 110 may have a different polarization after passing through the polarization modulator 160 than the reflection caused by a second object 110. Put differently, when the reflected light pulses reach the polarization modulator 160 of the shutter 124, the reflected light pulses experience a time-of-incidence-dependent phase retardation and a corresponding change in their polarizations, based on a trigger from the controller 102 (and/or the shutter driver 108). The analyzing polarizer 170 is arranged at an output of the polarization modulator 160 and can be used to convert a change in polarization to a change in intensity, which can be detected by the optical sensor 122.

In some embodiments, the controller 102 (and/or shutter driver 108) may implement a delay pulse generator that triggers the polarization modulator 160 at a certain delay time (τ) (e.g., after triggering the pulsed illuminator 104) to change the polarization state of the reflected light pulse. The controller 102 can trigger the polarization modulator 160 to change the polarization state by applying a time varying voltage, V(t), to the polarization modulator 160 during a modulating gate time, $T_G$ (which may also be referred to as a switching window). In some embodiments, the controller 102 can synchronize the pulsed illuminator 104 to the shutter 124 so that the reflections from the objects in the scene 130 are received while the phase retardation of the polarization modulator 160 changes monotonically. For example, the controller 102 can program the delay time, τ, to allow for detecting light that is reflected at different times. In some cases, τ can be programmed, such that the shutter 124 is triggered in time intervals $[\tau_1, \tau_1+T_G]$, $[\tau_2, \tau_2+T_G]$, etc. As used herein, each time interval $[\tau_i, \tau_i+T_G]$ (where $0 \geq \tau_i \leq T_G$) may be referred to as a gate time. By programming the delay time, τ, embodiments can allow for the scanning of multiple gate times over multiple cycles. As described below, the controller 102 can send the "shutter trigger" at a predefined frequency (e.g., $f_{PC}$) in order to drive the repetition rate of the shutter 124.

Figure 2A:
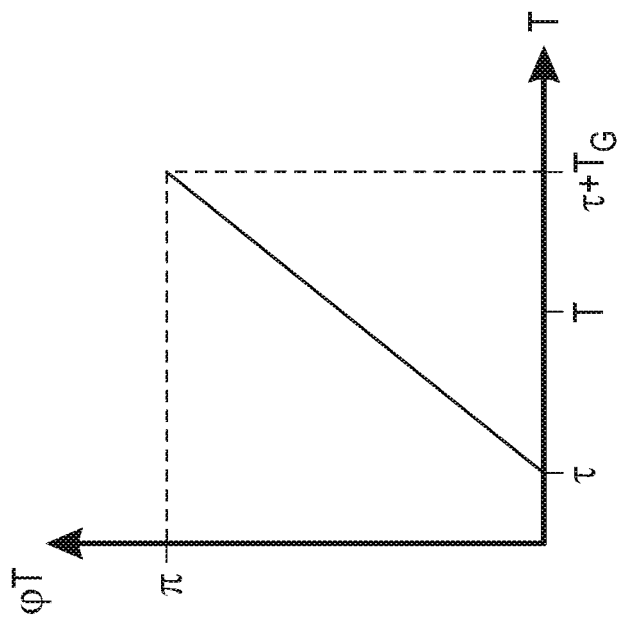
FIG. 2A is a graph of a voltage applied to a Pockels cell as function of time, according to one embodiment.
Figure 2B:
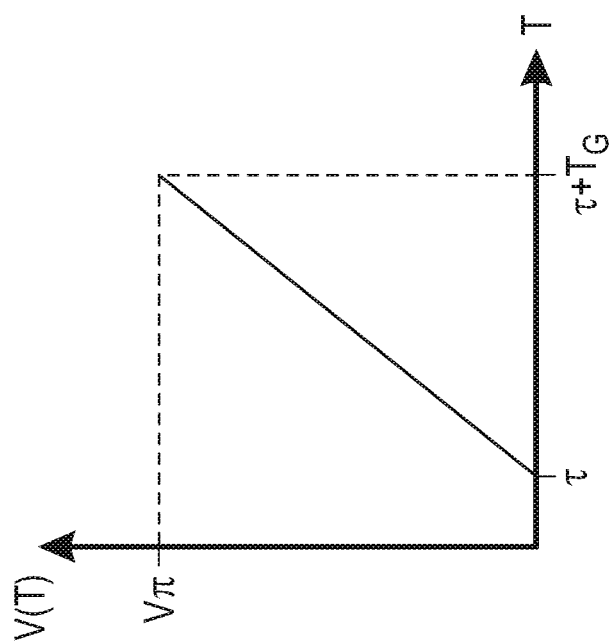
FIG. 2B is a graph of phase retardation of a light pulse as a function of time, according to one embodiment.

FIG. 2A illustrates a reference example of voltage applied to a polarization modulator 160 (e.g., a Pockels cell) of a shutter 124 as a function of time, according to one embodiment. When the controller 102 triggers the polarization modulator 160 (e.g., via the shutter driver 108), the voltage applied to the polarization modulator 160 begins to increase from zero voltage to the half-wave voltage $V_\pi$ (where $V_\pi$ is the half-wave voltage of a polarization modulator 160 having a first order EO effect (also known as the Pockels effect)). Because a phase retardation φ(t) is proportional to an applied voltage V(t), the applied voltage V(t) also triggers a change in the phase retardation φ(t). Note, in other embodiments, the bias voltage can increase from zero voltage to another voltage (e.g., set below $V_\pi$). For example, a DC bias or passive phase bias can be applied with a voltage swing set below $V_\pi$ in order to operate within more of the linear central region of the intensity modulator transfer function. As shown in FIG. 2B, as the reflected light pulse from scene 130 travels through the polarization modulator 160 during the gate time $T_G$, the reflected light pulse experiences a polarization-dependent phase retardation φ(t), and if a quarter-wave plate is placed after, the linear polarization state is rotated by an angle θ(t). However, in other embodiments, no quarter-wave plate is used. In some embodiments, the time of flight (ToF) of the reflected light pulse can be determined from the polarization rotation angle of the reflected light pulse.

Note that while FIGS. 2A and 2B depict the bias voltage and phase retardation for a polarization modulator 160, respectively, as increasing linearly with respect to time, in other embodiments, the bias voltage and phase retardation for the polarization modulator 160 may have non-linear shapes (e.g., periodic or sinusoidal waveform). Additionally, for materials exhibiting second order EO effects (e.g., Kerr materials), the phase retardation may be proportional to the voltage squared, and for materials exhibiting higher order EO effects, the phase retardation may have higher order voltage dependence. Regardless of the shape of the phase retardation, in one embodiment, the controller 102 may control the polarization modulator 160 such that the reflections are received when the phase retardation is monotonic. That is, if the polarization modulator 160 has a sinusoidal waveform, the controller 102 can ensure only a monotonic portion of the waveform is used to change the polarizations of the reflections. That way, reflections received at different times are guaranteed to have different polarizations (so long as the reflections are received when the phase retardation applied by the polarization modulator 160 is changing monotonically).

Referring back to FIG. 1, the analyzing polarizer 170 receives (from the polarization modulator 160) reflected light pulses with the modified polarization states and converts the reflected light pulses with the modified polarization states to light pulses that have a measurable intensity modulation. In one embodiment, the LIDAR system 100 can determine the range information based on the intensity of the reflected light pulse(s) measured by the optical sensor(s) 122. In one embodiment, the optical sensor(s) 122 is an image (e.g., camera) sensor that acquires image information from reflected light of a scene 130 onto a set of pixels. The optical sensor(s) 122 can generally include any type of image sensor, examples of which include, but are not limited to, charged coupled device (CCD) image sensors, complementary metal-oxide-semiconductor (CMOS) image sensors, etc. In one example, the controller 102 sends a control signal (e.g., "camera trigger" or "master trigger") to the optical sensor(s) 122 to control operation of the optical sensor(s) 122 (e.g., configure an camera exposure time of the optical sensor(s) 122).

In one embodiment, the optical receiver 120 includes a single optical sensor 122. In some embodiments where a single optical sensor 122 is used, the analyzing polarizer 170 may be a polarizer grid (e.g., micro polarizer array) that is patterned directly onto the optical sensor 122. Note, however, that this is merely an example and that other types of analyzing polarizers can be used with the optical sensor 122.

In another embodiment, two optical sensors 122 can be used to obtain range information of the scene 130. For example, the two optical sensors 122 can measure the respective intensities of the polarized components, and use the intensity information to compute the ranges between the LIDAR system 100 and the objects 110 in the scene 130. In this embodiment, a polarizing beam splitter can be used as the analyzing polarizer 170. In particular, as the polarization state of the light exiting the polarization modulator 160 changes in time, the range can be obtained from detected intensities after the polarizing beam splitter and knowledge of the changing function (e.g., phase retardation) of the polarization modulator 160. Optionally, the LIDAR system 100 can include a quarter-wave plate that converts an elliptical polarization output by the polarization modulator 160 into a linear polarization, and the analyzing polarizer (e.g., polarizing beam splitter) can split the linearly polarized light between two different optical sensors 122. In particular, a first polarized component (e.g., s-polarized light) can be sent to (or detected by) a first optical sensor 122 (e.g., the s-channel) and a second orthogonally polarized component (e.g., p-polarized light) can be sent to (or detected by) a second optical sensor 122 (e.g., the p-channel). Note, however, this is merely an example and that, in other embodiments, the LIDAR system 100 may include other types of analyzing polarizers that may behave differently.

Note that the LIDAR system 100 depicted in FIG. 1 is provided as a reference example of a LIDAR system 100 in which the techniques presented herein can be used. In other embodiments, the techniques presented herein can be used in other LIDAR system configurations which do not include a polarization modulator 160 as a shutter 124. Instead, the shutter 124 can be any device capable of modulating light at relevant timescales when one or more reflections are received at the LIDAR system 100. Other suitable techniques for fast on/off modulation of light that can be used as the shutter 124 include photoacoustic devices (e.g., acousto-optic modulation), photo-elastic devices, Kerr effect and Pockels effect devices, carrier injection or electro-absorption (e.g., multi-quantum well stacks), and semiconductor saturable absorber mirrors (SESAM). These types of shutters may correspond to different functions than the phase retardation exhibited by a polarization modulator when switching between on and off states (or high/low states). For example, the shutter may exhibit a function of varying opacity as the shutter switches between a transparent (on) state and an opaque (off) state. In general, the function of the shutter is to change the intensity of the light, where the embodiment in FIG. 1 uses polarization as an intermediate stage to accomplish this task. The detector(s) (e.g., optical sensor(s) 122) measures an intensity. Whatever the means of modulation, the shutter converts the returned pulses to a variation in the intensity so that it can be measured by the detector(s). For example, SESAMs and electro-absorption would directly modify the opacity via an absorption mechanism. Acousto-optic modulation could use beam deflection to modulate the intensity of the returned pulses. In any case, the function may change a characteristic of the reflected pulses (e.g., intensity) that is dependent on the time the reflected pulses are received, similar to the polarization modulator changing the polarization of the reflected pulses depending on when they enter the shutter.

Figure 3:
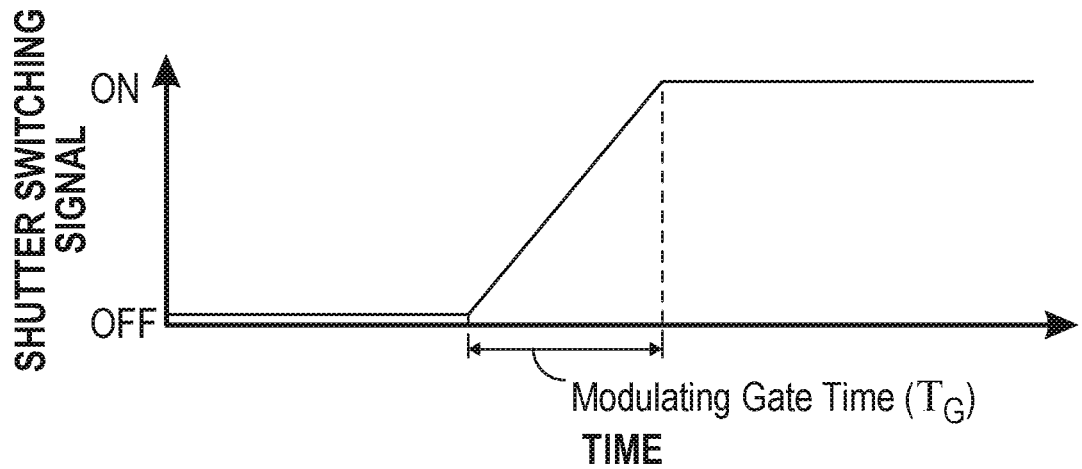
FIG. 3 illustrates an example switching window for an optical shutter, according to one embodiment.

As noted above, in shutter-gated LIDAR systems, the target range information is generally encoded onto the light pulses (reflected from the scene) that pass through the shutter while it is switching. As shown in FIG. 3, for example, if a pulse of scattered light (reflected) from a target passes through the shutter 124 while the shutter 124 is switching (within a modulating gate time $T_G$) from "off" to "on" (or vice versa), then the intensity of the received signal can be used to determine the ToF and, therefore, the range of the target. Note that in embodiments where the shutter 124 uses a tunable waveplate (e.g., Pockels cell), the polarization state of the received signal is changed during the switching, which corresponds to a change in received intensity through the use of one or more polarizers. In general, with this technique, a dimmer (low) signal may indicate that a target is relatively close (e.g., within a first distance) and a brighter (high) signal may indicate that a target is further away (e.g., within a second distance greater than the first distance).

One issue with the above approach, however, is that it may not be possible to determine range information (e.g., range discrimination may not be possible) for light that enters the shutter 124 before it starts switching or after it has finished switching. Consequently, the duration of the modulating gate time $T_G$ plays an important role in determining the range over which the shutter 124 can measure distance. In general, the target range (e.g., distance between the LIDAR system 100 and a target) can be determined using Equation (1):

$$\text{Range} = T_G \times \frac{c}{2} \qquad (1)$$

where c is the speed of light. Assuming a 20 nanosecond (ns) modulating gate time is configured (e.g., $T_G$=20 ns) for the shutter 124, the LIDAR system 100 may have a measurement range of approximately 3 meters (m).

Figure 4:
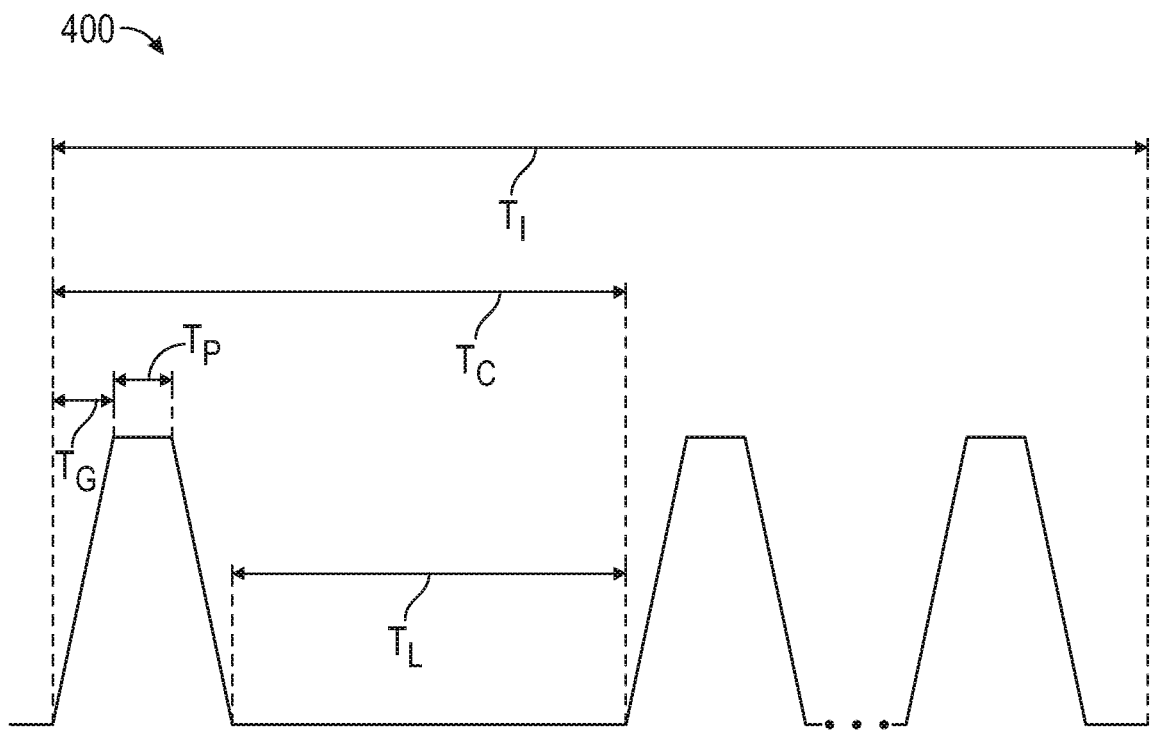
FIG. 4 is a timing diagram of operation a shutter, according to one embodiment.

FIG. 4 illustrates a timing diagram 400 of operating a shutter 124, e.g., in response to a shutter switching signal, according to one embodiment. The timing diagram 400 may represent a control signal for the shutter 124 (or more specifically, for the polarization modulator 160) such as voltage or current. Here, the timing diagram 400 includes multiple shutter cycles, $T_C$, which occur over an integration period, Ti, also referred to herein as a camera exposure time. That is, an integration period (or camera exposure) can include a plurality of shutter cycles, $T_C$. During the integration period, the optical sensor(s) 122 can measure the intensity of the light to generate a depth map of the scene.

Within each cycle, the timing diagram 400 turns "on" the (polarization modulator 160 of the) shutter 124 during a plateau time period, $T_P$ (e.g., an "on" or "high" state), and turns "off" the shutter 124 during an off or low time period, $T_L$ (e.g., a "low" or "off" state). Each shutter cycle, $T_C$, includes a first gate time period, $T_G$, where the controller 102 drives the shutter 124 to the "on" state, and a second gate time period (not shown) where the controller 102 drives the shutter 124 back down to the "off" state. In some embodiments, the first gate time period is different from the second gate time period. In other embodiments, the first gate time period is equal to the second gate time period, assuming the rising and falling edges of the shutter cycle are the same. $T_G$ may depend on the type of shutter being used. In general, embodiments may avoid using the second gate time period so that the transfer function of the shutter is monotonic with range.

Figure 5:
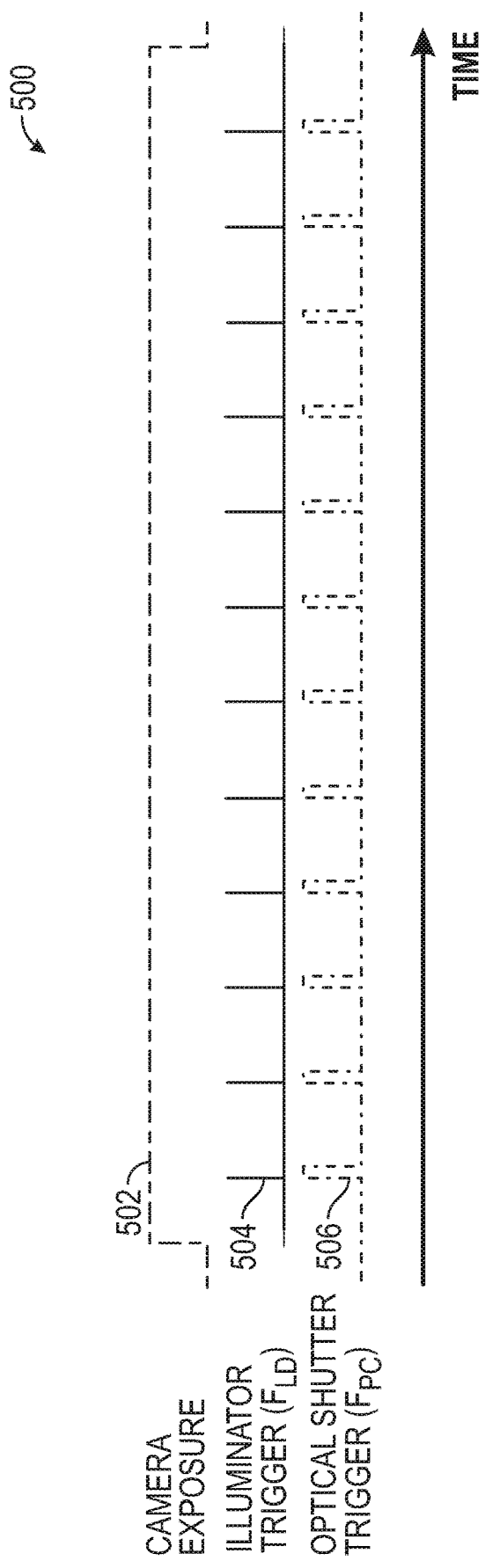
FIG. 5 is a timing diagram of operating a shutter and a laser source.

In conventional shutter-gated LIDAR systems, the pulsed illuminator 104 is generally synchronized with the shutter 124. FIG. 5 shows an example timing diagram 500 of operating a shutter (e.g., shutter 124) and a pulsed illuminator (e.g., pulsed illuminator 104) (e.g., in conventional shutter-gated LIDAR systems). The timing diagram 500 depicts a first control signal (e.g., illuminator trigger) 504 for the pulsed illuminator 104 and a second control signal (e.g., shutter trigger) 506 for the shutter 124. The first and second control signals may be a voltage or current. Note that, for ease of illustration, FIG. 5 depicts the first control signal 504 as a train of Dirac delta functions (also referred to as impulse functions, impulse train, etc.). More generally, the first control signal 504 is a train of short (or narrow) pulses (e.g., approximately 5 ns pulse width) that are approximately Gaussian in shape and the second control signal 506 is a train of wider pulses (e.g., approximately 200 ns pulse width) that are approximately rectangular in shape. For example, given a desired measurement range, the first control signal may use pulses that are narrower than the desired measurement range, and the second control signal may use pulses that are greater than the desired measurement range.

Because the LIDAR system 100 typically uses fast optical shutters and short optical pulses, the shutter 124 generally operates at a repetition rate that is significantly higher than the frame rate in order to increase the amount of collected light. Consequently, as shown in the timing diagram 500, the pulsed illuminator 104 and the shutter 124 can be triggered multiple times (e.g., hundreds to thousands of times) during a single camera exposure 502, which in turn allows the shutter 124 to capture multiple pulses (e.g., hundreds to thousands of pulses) of the pulsed illuminator 104 that are reflected from a scene during the single camera exposure 502. In this particular example, the controller 102 configures the first control signal 504 (e.g., $f_{LD}$) and the second control signal 506 (e.g., $f_{PC}$), so that pulsed illuminator 104 operates at the same repetition rate as the shutter 124. In particular, the controller 102 sets $f_{LD}=f_{PC}$.

Figure 7A:
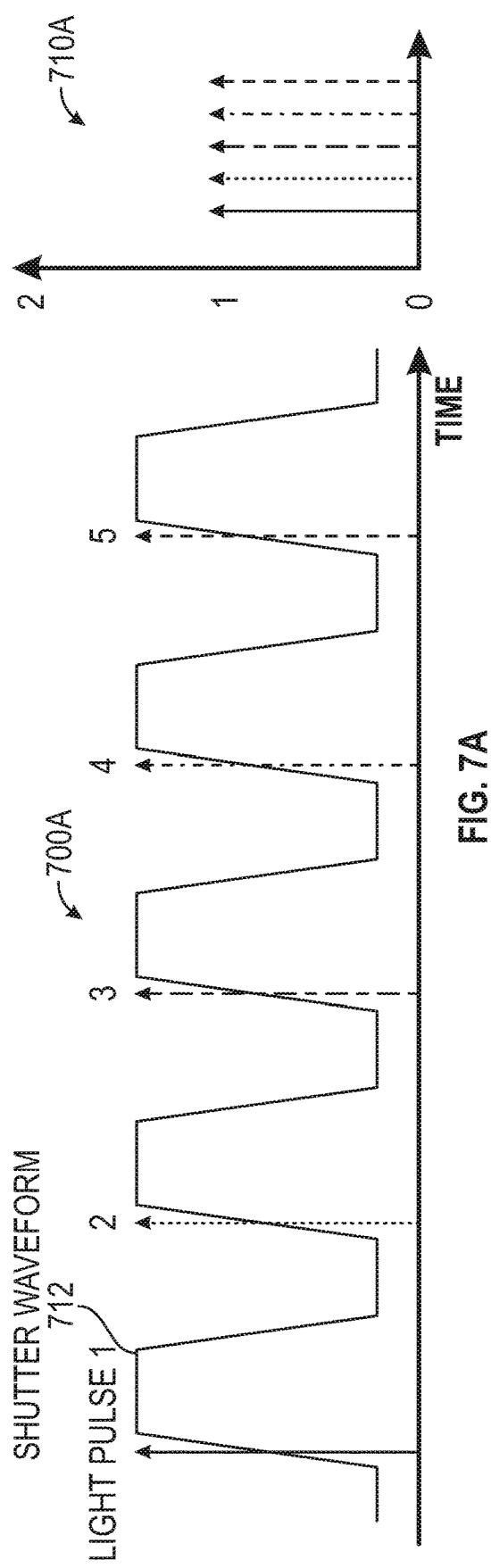
FIG. 7A illustrates operation of a shutter when a target is located in a center of a range gate of the shutter.

The synchronization of the pulsed illuminator 104 with the shutter 124 as depicted in the timing diagram 500 causes the shutter 124 to receive each reflected light pulse at a same point in time during a state of the shutter 124. For example, assume the pulsed illuminator 104 is configured to emit "x" number of light pulses during a single camera exposure (e.g., camera exposure 502) and the shutter 124 is configured to transition between "off" and "on" states "x" times during the single camera exposure. In this example, the pulsed illuminator 104 and the shutter 124 are generally synchronized so that the shutter 124, during each transition, receives a different one of the light pulses (reflected from a target) at a same point during the state of the shutter 124. This same point, for example, can be when the shutter 124 is in an "off" state (e.g., during $T_L$), when the shutter 124 is in an "on" state (e.g., during $T_P$), or when the shutter 124 is transitioning between "off" and "on" states (e.g., during $T_G$). FIG. 7A, for example, shows one scenario where each (reflected) light pulse "1", "2", "3", "4", and "5" is received at a different one of the time instances when the shutter 124 is transitioning from "off" to "on" (e.g., during $T_G$) FIG. 8A shows another scenario where each (reflected) light pulse is received at a different one of the time instances when the shutter is "off" (e.g., during $T_L$). Due to (1) the shutter 124 and the pulsed illuminator 104 being synchronized in this manner (e.g., in conventional approaches) and (2) the target range information being encoded onto pulses that pass through the shutter 124 as it is switching, this conventional approach can limit the measurement range of the LIDAR system 100.

Embodiments herein increase the measurement range of a LIDAR system (e.g., relative to conventional shutter-gated LIDAR systems) by synchronizing (or configuring) the pulsed illuminator 104 and the shutter 124, such that the shutter 124 receives or samples reflected light pulses over a wider range of the shutter cycle during the camera exposure (as opposed to the exact same point of each shutter cycle during the camera exposure). This wider range, for example, can include a time during $T_G$, $T_P$, and $T_L$ (e.g., up to $T_G+T_P+T_L$). In one particular embodiment, the controller 102 can configure the pulsed illuminator 104 and the shutter 124 to operate at different repetition rates in order to have the shutter 124 sample reflected light pulses over a wider range of the shutter cycle during the camera exposure. For example, embodiments can generate a trigger sequence to change the repetition rate of the shutter 124 (relative to the repetition rate of the pulsed illuminator 104), such that the shutter 124, during a camera exposure, receives reflected light pulses at different points during the shutter cycles (corresponding to different states of the shutter 124). In this manner, embodiments can dynamically increase the effective width of the shutter window (e.g., without changing the hardware or the shutter driving electronics), and therefore, the range of the LIDAR system 100.

Figure 6:
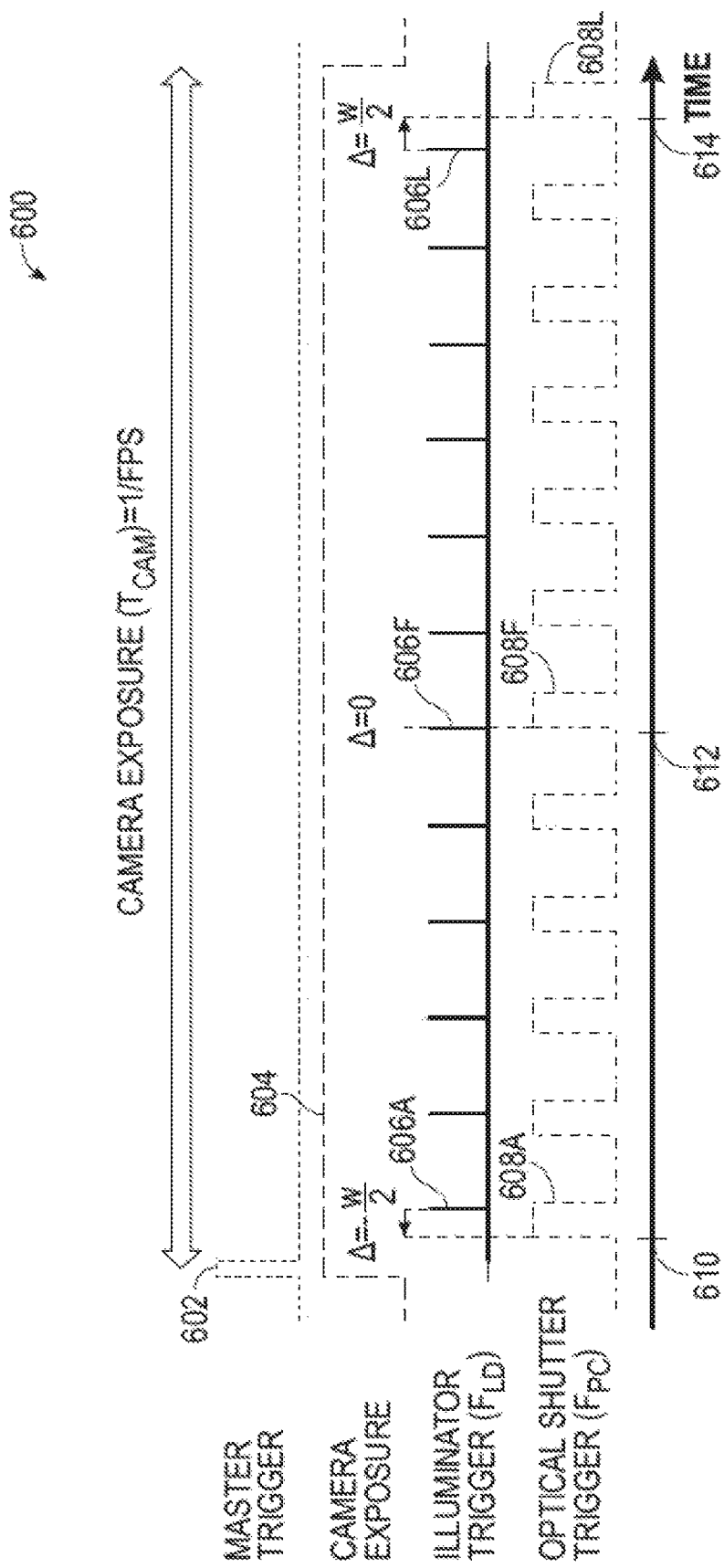
FIG. 6 is another timing diagram of operating a shutter and a laser source to broaden the measurement range of a LIDAR system, according to one embodiment.

FIG. 6 is a timing diagram 600 of operating a shutter 124 and a pulsed illuminator 104 to broaden the measurement range of a LIDAR system 100, according to one embodiment. Here, the controller 102 may generate a master trigger 602 that begins a camera exposure 604, triggers the generation of a trigger sequence 606 for the pulsed illuminator 104, and triggers the generation of a trigger (pulse) sequence 608 for the shutter 124. Note that, for ease of illustration, the trigger sequence 606 is depicted as a train of Dirac delta functions. In general, the trigger sequence 606 is a train of short pulses (e.g., narrow Gaussian pulses) and the trigger sequence 608 is a train of wider pulses (e.g., wider rectangular pulses). In one example, each pulse of the trigger sequence 606 can have an approximate 5 ns pulse width and each pulse of the trigger sequence 608 can have an approximate 200 ns pulse width. Note, however, that this is merely an example and that other pulse widths and other types of waveforms can be used for the trigger sequences 606, 608. During the camera exposure 604, the controller 102 generates (and sends) a trigger (or pulse) sequence 608 that changes a repetition rate (or frequency) of the shutter 124, such that the shutter 124 samples reflected light pulses over a wider range of the shutter cycles (or transitions).

As shown, the controller 102 creates a temporal walk-off (e.g., 24) between the train of pulses (of the trigger sequence 606) and the train of pulses (of the trigger sequence 608) during the camera exposure 604. For example, at a first time instance 610 (during the camera exposure 604), the temporal walk-off between the illuminator pulse 606A and the shutter pulse 608A is $$-\frac{w}{2}.$$

At a second (subsequent) time instance 612 (during the camera exposure 604), the temporal walkoff between the illuminator pulse 606F and the shutter pulse 608F is 0. At a third (subsequent) time instance 614 (during the camera exposure 604), the temporal walkoff between the illuminator pulse 606L and the shutter pulse 608L is w/2. This temporal walk-off effectively broadens the range gate of the shutter 124 tow, where w>$T_G$, which in turn increases the measurement range of the LIDAR system 100. The controller 102 may generate a new trigger sequence 606 and trigger sequence 608 for each camera exposure 604, e.g., based on the master trigger 602.

Note, however, FIG. 6 depicts merely a reference example of a trigger sequence that can be configured to broaden the range gate of the shutter 124, and that different trigger sequences can be used in other embodiments. In some embodiments, for example, the controller 102 may generate a trigger sequence that does not require a temporal offset between each shutter pulse and illuminator pulse. In some cases, the order of the shutter pulses (e.g., the delay for each shutter pulse) can be rearranged into a pseudorandom sequence that is evenly distributed across the desired measurement range. In general, the trigger sequence 608 may be a sequence generated by the controller 102, such that the shutter 124 samples reflected light pulses over a wider range of the shutter cycles during the camera exposure 604, relative to operation of the shutter in conventional shutter-gated LIDAR systems.

Generally, the intensity measured for each frame, $I_{frame}$, can be expressed (with Equation (2)) as the integral of the return illumination pulse, p(t), multiplied by the shutter transfer function, $s_i(t)$, summed over all of the pulses in the frame:

$$I_{frame}=\Sigma_{i=0}^{n-1}\int_0^{T_c}p(t)s_i(t)dt \qquad (2)$$

For this example, the pulse is assumed centered and symmetric about the middle of the shutter period, such that the return pulse peak occurs at $t=T_c/2$ from a target located in the middle of the desired measurement range. And, to maximize measurement range, this pulse peak should be aligned to the center of the shutter's modulating gate at $t=T_c/2$ when $i=(n-1)/2$. This assumes that the shutter transfer function is shifted by a time step $\Delta_{pp}$ each shutter period, $T_c$, and that the desired measurement range is w. For the general expression for the shutter function in Equation (3) below, $s_o(0)$ defines the center of the modulating gate, where the shutter is turned on half-way:

$$s_i(t) = s_0(t - i\Delta_{pp} + w/2 - T_c/2) \tag{3}$$

FIG. 7A is a diagram 700A that illustrates the relationship between operation of a shutter (e.g., represented by shutter waveform 712) and a sequence of reflected light pulses received by the shutter. The diagram 700A may be in response to the timing diagram 500 and may occur when the target is located in the center of the range gate of the shutter (e.g., during a shutter "on" transition time). As shown, the reflected light pulses "1"-"5" are received at different times at the shutter, as indicated by their different positions on the X-axis (which measures time). However, because the shutter and pulsed illuminator have the same repetition rate, each reflected light pulse is received by the shutter at a same point over each shutter cycle. In this case, that same point is the middle of each transition of the shutter from an "off" to "on" state (e.g., during $T_G$). Because each reflected pulse encounters the shutter at the same point of the shutter cycle, each of the reflected light pulses has a same intensity, e.g., as shown in graph 710A. In this case, assuming each of the reflected light pulses has a magnitude of "1," the optical sensor 122 (e.g., detector) may measure (e.g., using Equation (2)) a total intensity of "5" during the frame.

Figure 7B:
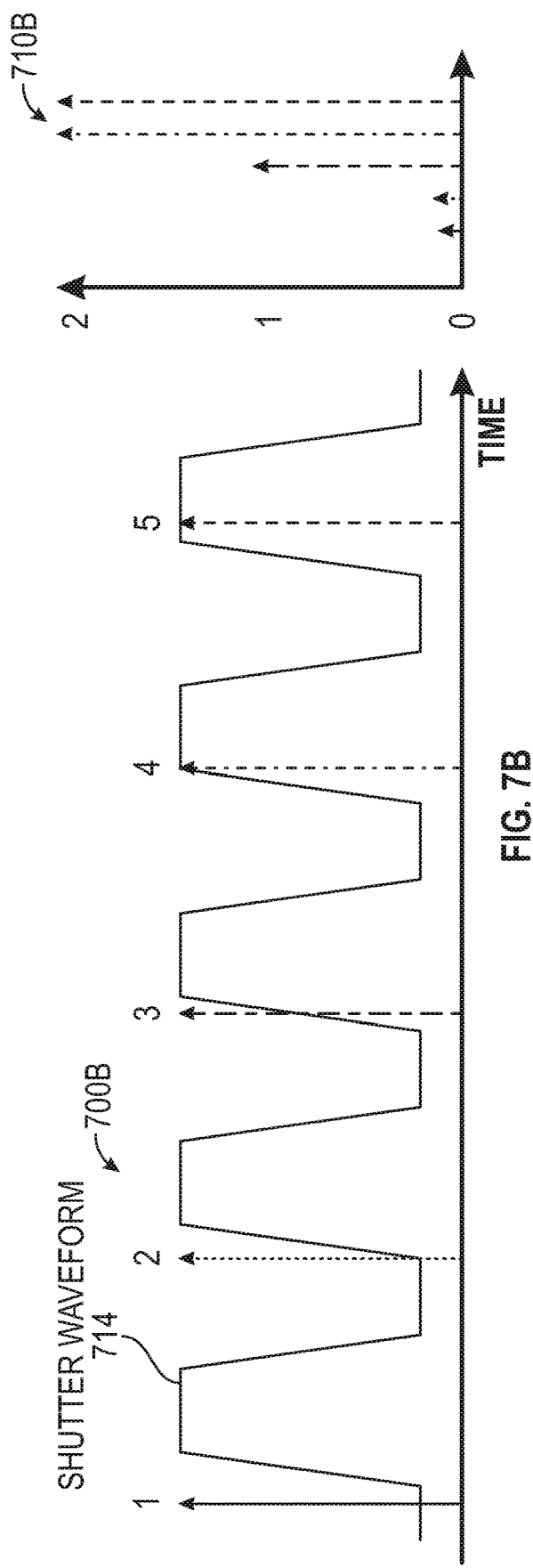
FIG. 7B illustrates operation of a shutter having an extended range gate when a target is located in a center of the range gate of the shutter, according to one embodiment.

FIG. 7B is a diagram 700B that illustrates the relationship between operation of a shutter (e.g., represented by shutter waveform 714) and a sequence of reflected light pulses received by the shutter, according to one embodiment. The diagram 700B may be in response to the timing diagram 600 and may occur when the target is located in the center of the range gate of the shutter (e.g., during a shutter "on" transition time). As shown, the reflected light pulses "1"-"5" are received at different times at the shutter, as indicated by their different positions on the X-axis (which measures time). However, compared to the diagram 700A, each reflected light pulse is received by the shutter at a different point over each shutter cycle. In particular, the reflected light pulse "1" is received by the shutter when the shutter is in an "off" state (e.g., during $T_L$), the reflected light pulse "2" is received by the shutter when the shutter is at a beginning of a transition from an "off" state to an "on" state (e.g., beginning of $T_G$), the reflected light pulse "3" is received by the shutter when the shutter is in the middle of the transition from "off" to "on" (e.g., middle of $T_G$), the reflected light pulse "4" is received by the shutter when the shutter is at an end of the transition to the "on" state (e.g., ending of $T_G$), and the reflected light signal "5" is received by the shutter when the shutter is in the "on" state (e.g., during $T_P$). As noted above, the diagram 700B may be caused by the temporal walkoff between the train of pulses (of the trigger sequence 606) and the train of pulses (of the trigger sequence 608) depicted in FIG. 6.

Because each reflected pulse encounters the shutter at different portions of the shutter pulse duration, the reflected light pulses may have different intensities, e.g., as shown in graph 710B. In this case, the magnitude of the reflected light pulse "1" may be approximately "0", the magnitude of the reflected light pulse "2" may be approximately "0", the magnitude of the reflected light pulse "3" may be approximately "1", the magnitude of the reflected light pulse "4" may be approximately "2" and the magnitude of the reflected light pulse "5" may be "2". In this case, the optical sensor 122 may also measure (e.g., using Equation (2)) a total intensity approximately equal to "5" during the frame.

FIG. 8A is a diagram 800A that illustrates the relationship between operation of a shutter (e.g., represented by shutter waveform 812) and a sequence of reflected light pulses received by the shutter. The diagram 800A may be in response to the timing diagram 500 and may occur when the target is located outside of the range gate of the shutter. Similar to diagram 700A, the reflected light pulses "1"-"5" are received at different times at the shutter, as indicated by their different positions on the X-axis (which measures time). However, because the shutter and pulsed illuminator have the same repetition rate, each reflected light pulse is received by the shutter at a same point over each shutter cycle. In this case, that same point is when the shutter is in an "off" state (e.g., during $T_L$) and no range information is encoded on the pulse. Because each reflected pulse encounters the shutter at the same point of the shutter pulse duration, each of the reflected light pulses has a same intensity, e.g., as shown in graph 810A. In this case, each of the reflected light pulses has a magnitude of "0" and the optical sensor 122 (e.g., detector) measures a total intensity of "0" during the frame. For example, the intensity measured during this frame, $I_{frame}$, (using Equation (2)) may be approximately equal to 0.

FIG. 8B is a diagram 800B that illustrates the relationship between operation of a shutter (e.g., represented by shutter waveform 814) and a sequence of reflected light pulses received by the shutter, according to one embodiment. The diagram 800B may be in response to the timing diagram 600 and may occur when the target is located outside of the range gate of the shutter. As shown, the reflected light pulses "1"-"5" are received at different times at the shutter, as indicated by their different positions on the X-axis (which measures time). However, compared to the diagram 800A, each reflected light pulse is received by the shutter at a different point over each shutter cycle. In particular, the reflected light pulse "1" is received by the shutter when the shutter is in an "off" state (e.g., during $T_L$), the reflected light pulse "2" is received by the shutter when the shutter is in an "off" state (e.g., during $T_L$), the reflected light pulse "3" is received by the shutter when the shutter is in an "off" state (e.g., during $T_L$), the reflected light pulse "4" is received by the shutter when the shutter is at a first point during the transition from "off" to "on" (e.g., first time instance during $T_G$) and the reflected light signal "5" is received by the shutter when the shutter is at a second (later) point during the transition from "off" to "on" (e.g., second subsequent time instance during $T_G$). As noted above, the diagram 800B may be caused by the temporal walk-off between the train of pulses (of the trigger sequence 606) and the train of pulses (of the trigger sequence 608) depicted in FIG. 6.

Because each reflected pulse encounters the shutter at different portions of the shutter cycle, the reflected light pulses may have different intensities, e.g., as shown in graph 810B. In this case, the magnitude of the reflected light pulse "1" may be approximately "0", the magnitude of the reflected light pulse "2" may be approximately "0", the magnitude of the reflected light pulse "3" may be approximately "0", the magnitude of the reflected light pulse "4" may be approximately "0.5" and the magnitude of the reflected light pulse "5" may be approximately "1.5". In this case, due to the walkoff between the pulse trains 606, 608, the optical sensor 122 is able to measure a total intensity approximately equal to "2" during the frame, compared to the measured intensity value of "0" (e.g., as shown in FIG.

8A). That is, the intensity measured during this frame, $I_{frame}$, (using Equation (2)) may be approximately equal to 2.

Figure 9:
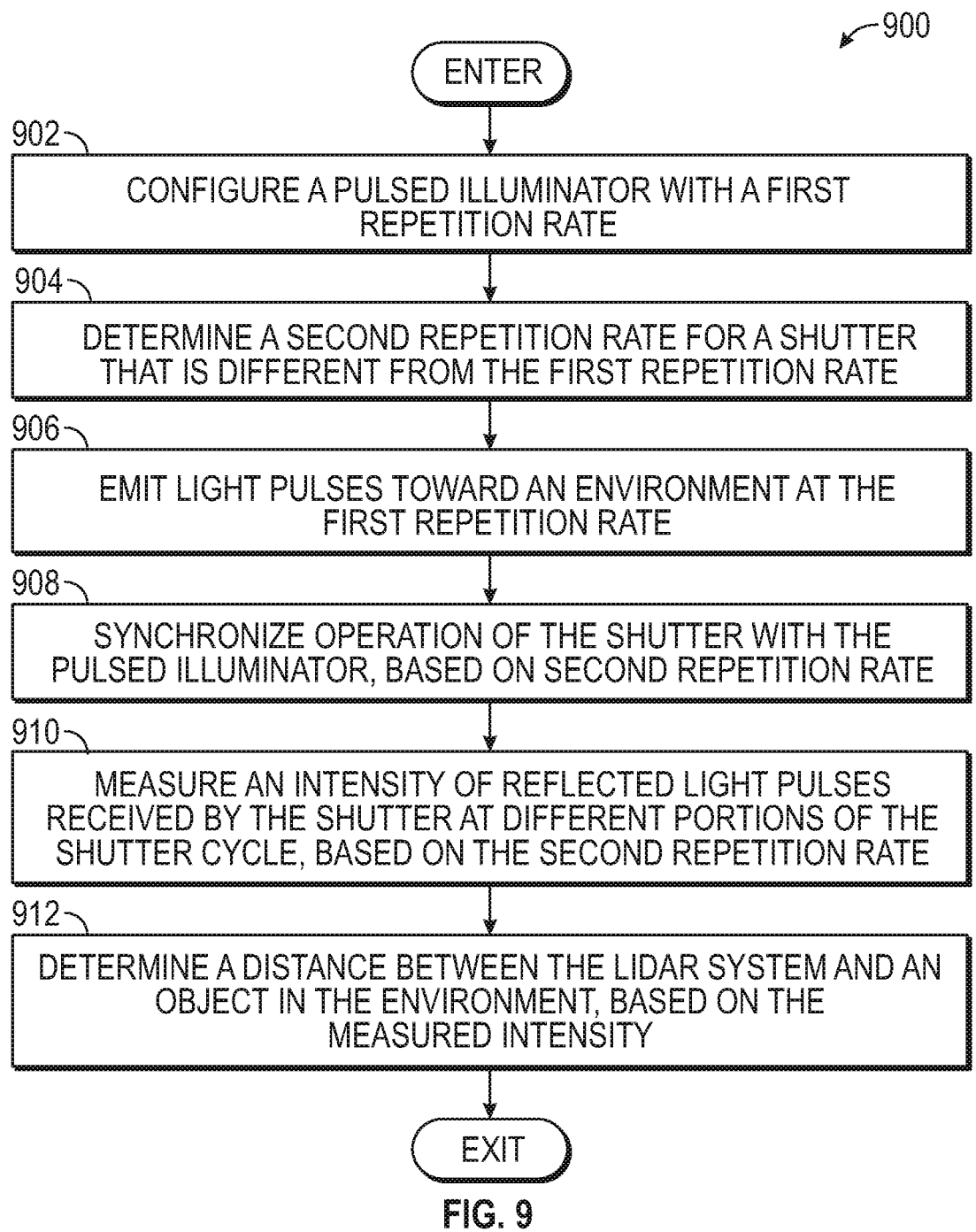
FIG. 9 is a flowchart of a method for increasing the measurement range of a LIDAR system, according to one embodiment.

FIG. 9 is a flowchart of a method 900 for increasing the measurement range of a LIDAR system, according to one embodiment. The method 900 may be performed by one or more components of the LIDAR system 100. In one particular embodiment, the method 900 is performed by a controller (e.g., controller 102).

The method 900 may enter at block 902, where the LIDAR system configures a pulsed illuminator (e.g., pulsed illuminator 104) with a first repetition rate (or frequency) (e.g., $f_{LD}$). At block 904, the LIDAR system determines a second repetition rate (or frequency) (e.g., $f_{PC}$) for a shutter (e.g., shutter 124) that is different from the first repetition rate. In one embodiment, the LIDAR system determines the second repetition rate based on the first repetition rate (e.g., $f_{LD}$), a frame rate (e.g., frames per second) of an image sensor (e.g., optical sensor 122), and a target (or desired) range (w) for the LIDAR system.

For example, given a desired gate broadening of w, the LIDAR system can determine the shutter repetition rate (or shutter burst frequency) ($f_{PC}$) using Equation (4):

$$f_{PC} = f_{LD} - f_{LD}^2 \Delta_{pp} \quad (4)$$

where $f_{LD}$ is the first repetition rate (e.g., illuminator pulse frequency) and $\Delta_{pp}$ is the shutter pulse walk-off per pulse. $\Delta_{pp}$ may be determined using Equation (5):

$$\Delta_{pp} = \frac{w}{n} \quad (5)$$

where w is the desired gate broadening (e.g., in time, typically on the order of nanoseconds), and n is the number of illuminator pulses per frame. n may be determined using Equation (6):

$$n \leq T_{CAM} * f_{LD} \quad (6)$$

where the camera exposure $$T_{CAM} \leq \frac{1}{\text{frame rate}}.$$

In one reference example, assuming w=100 ns, the frame rate=10 fps, $f_{LD}$=10 kilohertz (kHz), and n=1000 pulses in a burst captured by a single exposure, the LIDAR system can set $f_{PC}$ approximately equal to 9.99998889 kHz using Equations (4), (5), and (6).

At block 906, the LIDAR system emits light pulses towards an environment (e.g., scene 130) at the first repetition rate. At block 908, the LIDAR system synchronizes operation of the shutter, based on the second repetition rate, such that the light pulses reflected from the environment arrive at the shutter at different portions of the shutter cycle. For example, as noted above, at some time instances (during a camera exposure), the light pulses reflected from the environment may arrive at the shutter when the shutter is in an "off" state (e.g., during $T_L$); at other time instances (during the camera exposure), the light pulses reflected from the environment may arrive at the shutter when the shutter is in an "on" state (e.g., during $T_P$); and at yet other time instances (during the camera exposure), the light pulses reflected from the environment may arrive at the shutter when the shutter is transitioning from an "off" to "on" state (e.g., during $T_G$).

At block 910, the LIDAR system measures an intensity of the reflected light pulses received by the shutter at different portions of the shutter cycle (based on the second repetition rate) during the camera exposure. At block 912, the LIDAR system determines a distance between the LIDAR system and an object in the environment, based on the measured intensity.

Figure 10:
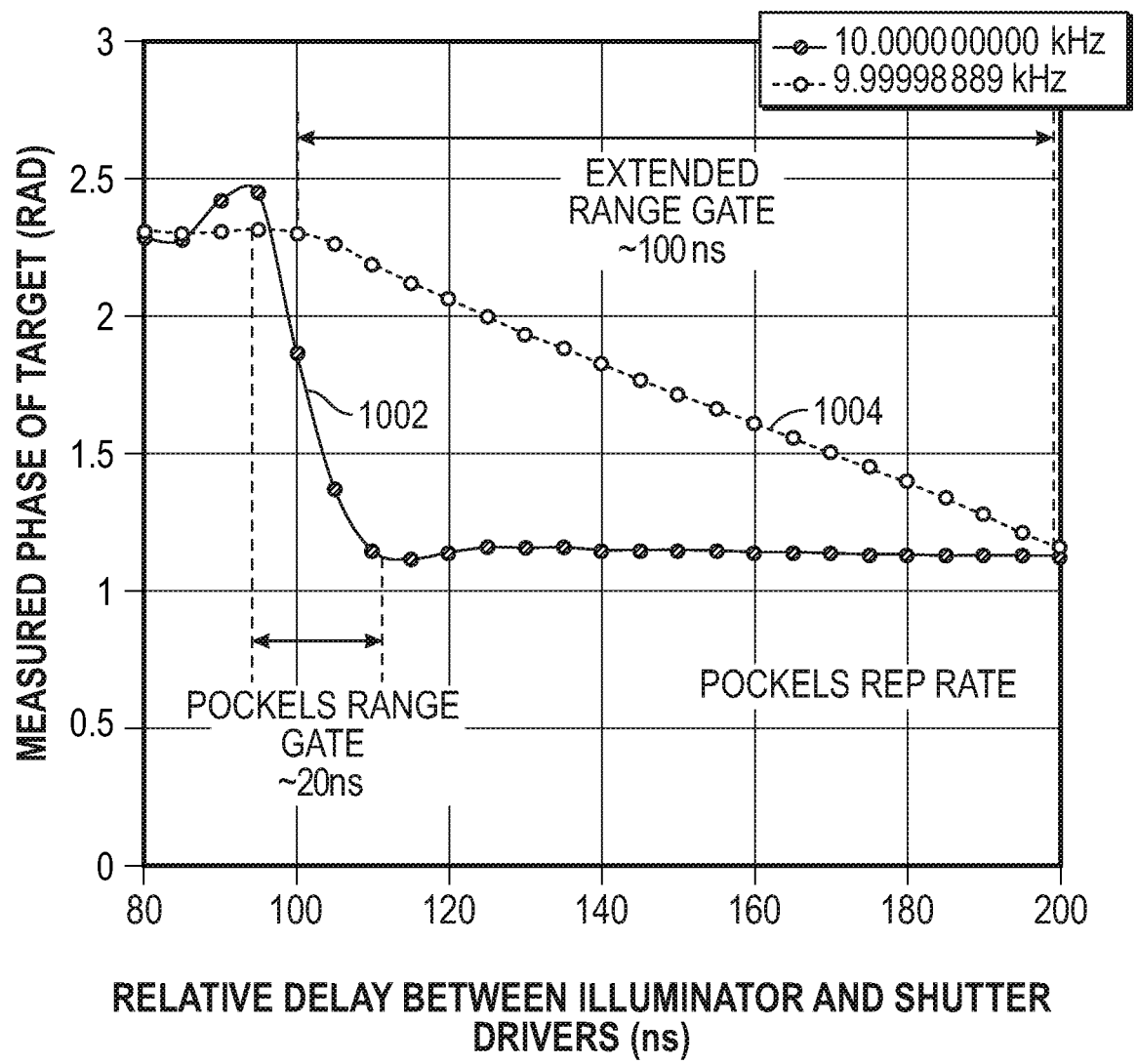
FIG. 10 shows an example measurement range of a LIDAR system having an extended range gate, according to one embodiment.

FIG. 10 shows an example measurement of the range of a LIDAR system (e.g., LIDAR system 100) for a conventional range gate and an extended range gate obtained using the techniques presented herein, according to one embodiment. For this example, the conventional range gate has a hardware configured modulating gate time (or switching window) $T_G$=20 ns, $f_{LD}$=10 kHz, the frame rate=10 fps, and n=900 pulses. As shown, using conventional techniques, the measurement range (represented by line 1002) of the LIDAR system may be limited to approximately 3 m (e.g., obtained using Equation (1), based on $T_G$=~20 ns), when the repetition rate of the shutter ($f_{PC}$) is equal to $f_{LD}$. In contrast, by setting $f_{PC}$ to a different repetition rate than $f_{LD}$ (e.g., $f_{PC}$=9.99998889 kHz), the range gate can be extended to ~100 ns, which corresponds to a measurement range (represented by line 1004) of approximately 15 m (e.g., obtained using Equation (1), based on $T_G$=~100 ns).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A light detection and ranging (LIDAR) system, comprising:
    a light source configured to emit light pulses toward a target;
    a shutter configured to receive reflections from the target caused by the light pulses;
    an image sensor arranged at an output of the shutter; and
    a controller configured to:

trigger the light source to emit the light pulses at a first repetition rate;
determine a second repetition rate for operation of the shutter, based at least in part on a target measurement range, the first repetition rate, and a frame rate of the image sensor, wherein the second repetition rate is different than the first repetition rate;
synchronize the operation of the shutter with the light source during a time period, based on the second repetition rate, such that the reflections from the target arrive at the shutter when the shutter is in different states during the time period, wherein:
at a first time instance during the time period, a first of the reflections from the target arrives at the shutter when the shutter is in an off state;
at a second time instance during the time period subsequent to the first time instance, a second of the reflections from the target arrives at the shutter when the shutter is transitioning from the off state to an on state; and
at a third time instance during the time period subsequent to the second time instance, a third of the reflections from the target arrives at the shutter when the shutter is in the on state;
measure, via the image sensor and during the time period, an intensity of the reflections from the target that arrive at the shutter when the shutter is in the different states; and
determine a range to the target based on the measured intensity of the reflections.

2. The LIDAR system of claim 1, wherein the shutter comprises:
a first polarizer configured to receive the reflections and output polarized reflections;
a polarization modulator configured to receive the polarized reflections and modify a polarization state of each of the polarized reflections; and
a second polarizer configured to receive the polarized reflections with the modified polarization states and output intensity modulated reflections.

3. The LIDAR system of claim 2, wherein:
the time period comprises a plurality of cycles, each comprising an off time, a gate time, and a plateau time;
a phase retardation of the polarization modulator changes monotonically during the gate time; and
the phase retardation is constant during the off time and the plateau time.

4. The LIDAR system of claim 1, wherein the time period corresponds to a time of exposure of the image sensor for a single frame.

5. A system, comprising:
a light source configured to emit light pulses toward a target;
a shutter configured to receive reflections from the target caused by the light pulses;
an image sensor arranged at an output of the shutter and configured to receive the reflections from the target passing through the shutter; and
a controller configured to:
synchronize operation of the shutter with the light source during a time period, such that the reflections from the target arrive at the shutter when the shutter is in different states during the time period, wherein:
at a first time instance during the time period, a first of the reflections from the target arrives at the shutter when the shutter is in an off state;
at a second time instance during the time period subsequent to the first time instance, a second of the reflections from the target arrives at the shutter when the shutter is transitioning from the off state to an on state; and
at a third time instance during the time period subsequent to the second time instance, a third of the reflections from the target arrives at the shutter when the shutter is in the on state;
measure, via the image sensor and during the time period, an intensity of the reflections from the target that arrive at the shutter when the shutter is in the different states; and
determine a range to the target based on the measured intensity of the reflections.

6. The system of claim 5, wherein the time period corresponds to a time of exposure of the image sensor for a single frame.

7. The system of claim 5, wherein the different states of the shutter comprise the off state, the on state, and a state during which the shutter is transitioning from the off state to the on state.

8. The system of claim 5, wherein a function of the shutter changes monotonically when the shutter is transitioning from the off state to the on state.

9. The system of claim 5, wherein the shutter has a hardware configured switching window during which the shutter transitions from the off state to the on state.

10. The system of claim 9, wherein each of the first time instance, the second time instance, and the third time instance occurs within the hardware configured switching window.

11. The system of claim 9, wherein each of the first time instance, the second time instance, and the third time instance occurs outside of the hardware configured switching window.

12. The system of claim 11, wherein a sum of the intensities of the first reflection, the second reflection, and the third reflection is greater than zero.

13. The system of claim 5, wherein synchronizing the operation of the shutter with the light source during the time period comprises:
generating a trigger sequence to control the operation of the shutter, the trigger sequence being configured to change an occurrence of each of a plurality of shutter cycles during the time period, relative to an occurrence of each of the light pulses during the time period; and
sending the trigger sequence to the shutter during the time period.

14. The system of claim 13, wherein the occurrence of each of the plurality of shutter cycles is random during the time period.

15. A method for increasing a measurement range of a light detection and ranging (LIDAR) system, the method comprising:
triggering a light source of the LIDAR system to emit light pulses towards a target;
synchronizing operation of a shutter of the LIDAR system with the light source during a time period, such that reflections from the target caused by the light pulses arrive at the shutter when the shutter is in different states during the time period, wherein:
at a first time instance during the time period, a first of the reflections from the target arrives at the shutter when the shutter is in an off state;
at a second time instance during the time period subsequent to the first time instance, a second of the reflections from the target arrives at the shutter when the shutter is transitioning from the off state to an on state; and at a third time instance during the time period subsequent to the second time instance, a third of the reflections from the target arrives at the shutter when the shutter is in the on state;

measuring, via an image sensor of the LIDAR system and during the time period, an intensity of the reflections from the target that arrive at the shutter when the shutter is in the different states; and determining a range to the target based on the measured intensity of the reflections.

16. The method of claim 15, wherein the different states of the shutter comprise the off state, the on state, and a state during which the shutter is transitioning from the off state to the on state.

17. The method of claim 15, wherein a function of the shutter changes monotonically when the shutter is transitioning from the off state to the on state.

18. The method of claim 15, wherein the shutter has a hardware configured switching window during which the shutter transitions from the off state to the on state.

19. The method of claim 18, wherein each of the first time instance, the second time instance, and the third time instance occurs within the hardware configured switching window.

20. The method of claim 18, wherein each of the first time instance, the second time instance, and the third time instance occurs outside of the hardware configured switching window.

* * * * *